United States Patent
Menzies et al.

[15] 3,637,397
[45] Jan. 25, 1972

[54] PUFFED INSTANT COFFEE SPHERES

[72] Inventors: James H. Menzies, Springfield Township, Hamilton County; Joseph R. McSwiggin, Cincinnati, both of Ohio

[73] Assignee: The Proctor & Gamble Company, Cincinnati, Ohio

[22] Filed: July 17, 1969

[21] Appl. No.: 842,586

[52] U.S. Cl. ................................................ 99/65, 99/71
[51] Int. Cl. ............................................................. A23f 1/04
[58] Field of Search ................................. 99/68, 71, 82, 65

[56] References Cited

UNITED STATES PATENTS

| | | |
|---|---|---|
| 2,509,681 | 5/1950 | Flosdorf..............................99/71 UX |
| 3,419,399 | 12/1968 | Earle, Jr. et al..........................99/71 |
| 3,464,828 | 9/1969 | Cummisford..............................99/82 |
| 3,485,637 | 12/1969 | Adler et al................................99/71 |

Primary Examiner—Frank W. Lutter
Assistant Examiner—William L. Mentlik
Attorney—Edmund J. Sease

[57] ABSTRACT

A process for producing instant coffee in the form of distinctively appearing multidimensionally puffed spheres having very fast dissolving properties comprises forming a coffee dough, cooling the dough to form hardened slabs, grinding the slabs into discrete particles and multidimensionally puffing said particles by exposing them to heat and vacuum to form puffed instant coffee spheres and subsequently granulating the spheres to produce a product resembling roast and ground coffee in appearance.

12 Claims, 1 Drawing Figure

PATENTED JAN 25 1972　　　　　　　　　　　　　3,637,397
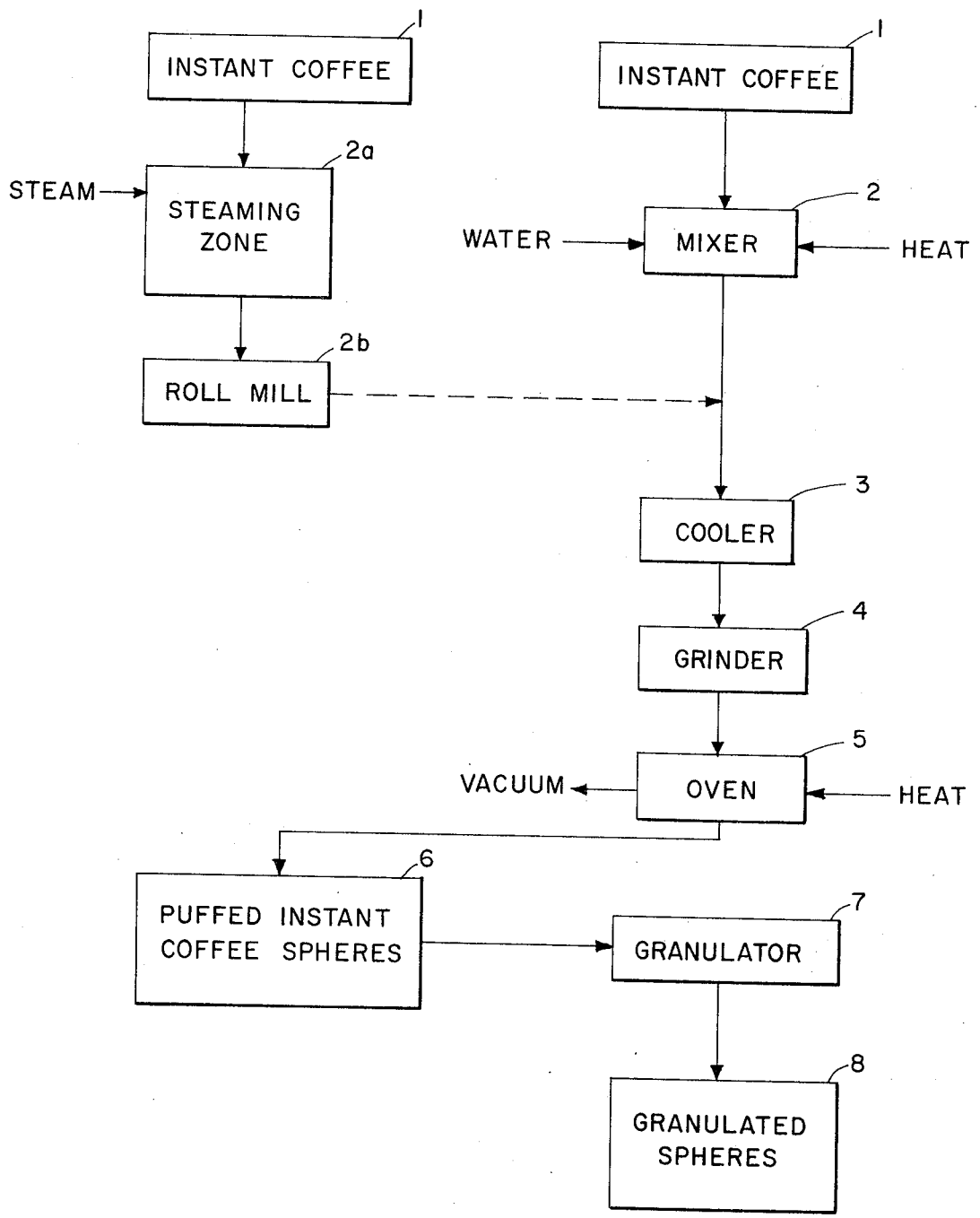
INVENTORS
James H. Menzies
Joseph R. McSwiggin
BY Edmund J. Sease
ATTORNEY

— 3,637,397 —

PUFFED INSTANT COFFEE SPHERES

BACKGROUND OF THE INVENTION

For many years producers of instant coffee have sought to improve the acceptance of this type of coffee product, vis-a-vis roast and ground coffee. Much effort has gone into improving the flavor quality of instant coffee. While absolute equality of the flavor of instant coffee, as compared to roast and ground coffee is yet to be achieved, substantial improvements in the flavor of instant coffee, have been made and a significant increase in consumer acceptance of instant coffee has occurred in the last decade. While flavor improvement has been a particularly important factor in the increased consumer acceptance of instant coffee, it has become increasingly apparent that other characteristics of instant coffee such as aroma, foaming properties, solubility properties, and appearance can also greatly affect the acceptability of an instant coffee.

In spite of the more recent recognition of the importance of appearance of instant coffee, instant coffees presently marketed in the United States are confined to three principal physical forms. These forms are spray-dried powders, agglomerates of instant coffee particles, and most recently freeze-dried chunks of instant coffee.

Of the above three mentioned physical forms, spray-dried powders are the most common. These are produced from a percolate of brewed coffee which is sprayed in a fine mist into a tower several stories high. The air in the tower is hot enough that the coffee dries as it falls and becomes a dry instant coffee powder, usually light brown in color, by the time it reaches the bottom of the tower. The majority of the instant coffee products marketed today are of this type.

Of more recent vintage are products comprising agglomerates of instant coffee particles. For example, U.S. Pat. No. 2,977,203 discloses that instant coffee powder can be darkened or agglomerated with a jet of steam to provide a product with a "robust" appearance when the instant coffee powder and the jet of steam are arranged in a highly specific planar relationship. For an additional example of an agglomeration process see copending and commonly assigned application Lombana et al. Ser. No. 797,322, filed Jan. 9, 1969, which relates to an agglomerated product comprising agglomerates of flaked instant coffee and particulate instant coffee.

The most recent unique-appearance instant coffee product sold on the market comprises freeze-dried chunks of instant coffee. In fact, some of the freeze-dried instant coffees are the only coffees presently marketed that can be said to in no way resemble roast and ground coffee.

In regard to the appearance of instant coffee, the dominant approach first taken and still in existence in the industry, with the exception of a few freeze-dried products, is that a product which is meant to taste like roast and ground coffee should also look like roast and ground coffee; but despite the logic of this statement more recent consumer experience indicates that a lumpy product, i.e., freeze-dried chunks not resembling roast and ground coffee, can enjoy a fair share of the market.

The experience with freeze-dried chunks and more recent market research has indicated a consumer willingness to accept a novel appearing coffee which is different from conventional instant, or roast and ground coffee for that matter, as a new form of coffee and they therefore have been induced to try such new products which look unlike anything else they have seen before.

U.S. Pat. No. 3,419,399, issued Dec. 31, 1968, represents one of the more recent approaches to producing preferred appearance instant coffee products. As described in this patent, an instant coffee dough is puffed in one dimension and thereafter ground to yield a product substantially similar to roast and ground coffee in appearance. The patent teaches the essential nature of a one-dimensional puff and in fact teaches away from multidimensional puffing. Moreover, the one-dimensionally puffed dough is subsequently ground which, it is believed, would destroy any unique product appearance.

It is an object of this invention to form distinctive appearing multidimensionally puffed instant coffee spheres. It is also an object of this invention to provide a commercially feasible process for forming puffed instant coffee spheres.

These and other objects will become apparent from the following description.

SUMMARY OF THE INVENTION

This invention relates to multidimensionally puffed instant coffee spheres having fast-dissolving properties and to a method of making said spheres. The invention also relates to a product closely resembling roast and ground coffee in appearance which comprises granulated puffed instant coffee spheres having curved surfaces which impart the same distinctive appearance as the curved surfaces of ground coffee beans.

Speaking with most particular reference to the process, the invention comprises the steps of a. Adding moisture to dry instant coffee to increase the total moisture content of said coffee to within the range of from 6.0 to 15.0 percent to provide a moistened instant coffee; and b. Heating said moistened instant coffee to a temperature within the range of from 150° to 210° F., and mixing said moistened instant coffee to provide a flowable substantially uniform dough; and thereafter, c. Cooling said dough to provide sheetlike slabs of solidified instant coffee; and thereafter, d. Grinding said slabs to provide discrete particles of soluble coffee of a particle size of between 6-mesh and 20-mesh U.S. Standard Screen sizes; and thereafter, e. Heating said discrete particles to temperatures of from 100° to 210° F. at a vacuum pressure of from 20 to 30 inches of mercury whereby moisture contained in said particles is rapidly driven off and said particles multidimensionally puff to provide puffed instant coffee spheres.

BRIEF DESCRIPTION OF THE DRAWING

The FIGURE herein is a block diagram flow chart outlining the process of the invention. Specific description and reference is made to the FIGURE in regard to the examples.

DETAILED DESCRIPTION OF THE INVENTION

The instant coffee utilized in the process of this invention to provide multidimensionally puffed instant coffee spheres can be any one of the commercially available instant coffees sold on the market. These include instant coffee powders, agglomerates and freeze-dried chunks. Because of its ready availability it is preferred that the instant coffee utilized in the process of this invention be an instant coffee powder; however, coffee extract per se can also be concentrated and dried to provide limited moisture contents within the range disclosed herein.

For clarity of description the following discussion will be in terms of steps as shown in the summary of the invention. Specific reference will be made to the accompanying flow diagram in the examples.

Speaking now with particular reference to the steps of the process as disclosed in the summary of the invention, in the first step, step (a), moisture is added to dry instant coffee to increase the total moisture content of the instant coffee to within the range of from 6.0 to 15.0 percent. Commercially obtainable instant coffee usually has a moisture content of from 2 to 4 percent and, consequently, it is contemplated in step (a) of this process that a sufficient amount of moisture be added to provide a total moisture content of from 6.0 to 15.0 percent. If the moisture level of the instant coffee is not increased to at least 6 percent, insufficient moisture is present to provide a flowable substantially uniform dough which is essential in making the puffed instant coffee spheres of this invention. On the other hand, if the moisture level is increased to a level greater than 15 percent, a flowable substantially uniform dough is not formed; the result is a syrupy solution rather than the desired dough.

Ideally, coffee dough formed after adding moisture and heating, as hereinafter described in step (b), is about of the consistency of bread dough, that is to say, it is plasticlike in nature, substantially uniform and yet to a certain degree maintains its discrete particlelike characteristics. To obtain such a coffee dough a preferred moisture level has been found to be from 7.0 to 10.0 percent. Providing a moisture content of the instant coffee within this preferred range allows the subsequent processing to be conducted in the most efficient and economical manner.

The moisture in step (a) can be added by simply admixing instant coffee and water in a conventional mixing apparatus such as a batch mixer or a kneader or a continuous mixing device such as a roll mill.

Either simultaneously with the addition of moisture, or subsequent thereto, the instant coffee is heated to a temperature within the range of from 150° to 210° F. It is essential that the instant coffee be heated to a temperature within the range of from 150° to 210° F. in order to accomplish mixing in step (b) to provide a substantially uniform dough. At temperatures below 150° F. the dough cannot be mixed to obtain a uniform dough because of the highly viscous and tacky characteristics of the moistened instant coffee. Temperatures above 210° F. should be avoided because as one approaches the boiling point of water, moisture is driven out of the dough and consequently subsequent puffing as hereinafter described, may not occur. Also, as the temperature increases above 210° F., a substantial flavor degradation of the instant coffee occurs. From a processing standpoint temperatures of from 160° to 180° F. are preferred.

As hereinafter briefly mentioned, one method of adding the required moisture and heat of steps (a) and (b) is a simultaneous addition accomplished by feeding instant coffee particles through a steaming zone. In this manner moisture addition and heating are accomplished simultaneously. In this highly preferred operation of the process of this invention instant coffee particles, after passing through a steaming zone, can be directly fed through a roll mill wherein mixing is accomplished by passing said moistened particles through the nip of the rolls. This preferred operation is designated in the FIGURE by subscripts accompanying each number and is demonstrated specifically in example II.

In step (c) the previously prepared substantially uniform coffee dough is cooled to provide sheetlike slabs of solidified or hardened instant coffee. If the mixing vessel is a batch mixing vessel such as a kneader or a conventional batch mixer, the dough is removed therefrom and uniformly spread on trays in a thin layer. If the mixing apparatus is a roll mill, the moistened and heated particles, after passing through the nip of the mill, are fed off of said rolls in a thin slablike layer, therefore no additional spreading into layers is required.

No criticality exists with respect to the cooling time or temperature. All that is required is a sufficient time at a low enough temperature to convert the uniform dough phase to a solid phase. Ambient conditions for from 15 minutes to 8 hours have been found sufficient in nearly all cases. However, especially at higher moisture levels, i.e., from 10.1 to 15.0 percent, it is preferred that temperatures less than 40° F. and times of from 1 hour to 4 hours are employed. In all cases the temperature selected for cooling can be a temperature within the range of from 20° to 80° F.

The thickness of the sheetlike dough layer provided in step (c), may control to a limited extent at least one size dimension of the hereinafter described multidimensionally puffed instant coffee spheres. For purposes of ultimate process efficiency, preferred sphere sizes are obtained when the thickness of the solidified slab of instant coffee ranges from one thirty-second inch to one-quarter inch, with one-sixteenth inch to one-eighth inch being most preferred.

As a result of the cooling procedure, the thin doughlike layer is converted to a solid phase, sheetlike frangible slab of solidified instant coffee. In step (d) these frangible slabs of solidified instant coffee are ground to provide discrete particles of instant coffee of a particle size of from 6-mesh to 20- mesh U.S. Standard Screen sizes. The size of the discrete particles formed in the grinding operation of step (d) controls the ultimate size of the puffed instant coffee spheres produced as hereinafter described. Most highly preferred consumer acceptable puffed instant coffee spheres are produced when the discrete particles have a particle size of from 12-mesh to 18-mesh U.S. Standard Screen sizes.

The grinding procedure of step (d) can be accomplished in any suitable coffee grinder such as a Gump grinder, a LePage roll grinder, a Fitzpatrick hammer mill or any other size reduction apparatus used in the coffee industry.

While the most preferred method of forming discrete particles is by grinding it is conceivable that desirably sized particles would be formed by pelletizing the sheetlike dough layer.

In step (e) of the process of this invention the discrete instant coffee particles hereinbefore described are heated to a temperature within the range of from 100° to 210° F. and at a vacuum pressure of from 20 to 30 inches of mercury whereby moisture contained in the discrete particles is rapidly driven off and the particles multidimensionally puff to provide puffed instant coffee spheres.

It is important that the temperature utilized in the puffing operation of step (e) not be above 210° F. At temperatures above 210° F., the instant coffee is scorched and flavor degraded as hereinbefore explained. Temperatures below 100° F. should not be employed because the rapidity of puffing becomes so slow as to be impractical. A preferred temperature range is from 180° F. to 205° F.

It is also essential in the puffing procedure that the discrete particles be vacuum puffed. This is so because the high pressures employed in high pressure puffing, for example, as utilized in the cereal field, cause rapid expansion coupled with subsequent shattering of the resulting instant coffee spheres. It is believed that high-pressure puffing fails with regard to producing puffed instant coffee spheres and is successful in producing puffed cereals because of the difference in the nature of the structure of materials being puffed. Cereals are fibrous in structure and, consequently, the particles have a greater tendency to adhere than do the particles of instant coffee which are lacking in fiber structure.

The particles to be oven puffed are uniformly spread into a layer upon trays. Puffing has been found to be somewhat impeded if the layer becomes thicker than about three-quarter inch. Particularly satisfactory results are obtained when the particle layer is within the preferred thickness range of from one-sixteenth inch to one-quarter inch. As a general guide line the particle layer should not be thicker than the cumulative thickness of 5 of the discrete particles produced in step (d).

The trays containing layers of the discrete particles are placed in a vacuum oven wherein the temperature is controlled within the hereinbefore described range and the vacuum pressure is within the range of from 20 to 30 inches of mercury and preferably from 25 to 30 inches of mercury. Puffing will occur almost immediately wherein multidimensionally puffed instant coffee spheres are produced. Depending upon the size of the discrete particles the puffed spheres can range in size from extremely small up to pea size and even larger.

The resulting multidimensionally puffed instant coffee spheres have a crustlike outer surface and a highly porous center portion. The most desirable and consumer acceptable multidimensionally puffed instant coffee spheres are produced when the spheres have a particle size ranging from 6- to 16-mesh U.S. Standard Screen sizes, and a density of from 0.25 grams/cc. to 0.35 grams/cc.

If a unique appearance instant coffee product is desired, the multidimensionally puffed instant coffee spheres, hereinbefore described, can be sold as a consumer product. One particular advantage of the puffed spheres of this invention, not exhibited by other physical forms of instant coffee products, is that the puffed instant coffee spheres have very fast dissolving properties. In fact, it can be said that the spheres almost "burst" into solution upon contact with hot water. The increased dissolving propensity of the spheres of this invention provide consumer desirability because no waiting time is required for the coffee to dissolve and excessive stirring to insure complete solution can be eliminated.

Roast and ground coffee particles, upon careful examination are seen not to be cube-shaped particles but rather most of the particles retain a small portion of the original curvature of the coffee bean. Consequently, to provide an instant coffee product closely resembling roast and ground coffee appearance at least a portion of the particles should have curved surfaces similar in nature to the curvatures of the surface of coffee beans.

If desired, multidimensionally puffed instant coffee spheres of this invention can be readily converted into a product substantially identical in appearance to roast and ground coffee by granulating the spheres. Therefore, as an additional embodiment of the process of this invention, an additional step comprises granulating puffed spheres to provide particles having curved surfaces which impart the same distinctive appearance as the curved surface of coffee beans.

The granulating step results in granulated particles having surface curvatures very similar to the surface curvatures of roast and ground coffee particles. It is important to note that the additional step comprises granulating and *not* grinding. Granulating as used herein means shattering by an impact force such as can be done in an impact mill or a hammer crusher. It is to be distinguished from grinding which as used herein refers to size reduction that also involves particle attrition; i.e., a shearing action. Utilization of grinders which impart a rubbing and shearing action, for example attrition mills, destroys the curved surfaces of the puffed instant coffee sphere particles. On the other hand, smashing and shattering both of which will occur in granulation as defined herein, allows for retention of particle surface curvature in the resulting product.

Granulated spheres of a particle size of between an 8-mesh U.S. Standard Sieve Screen and a 20-mesh U.S. Standard Sieve Screen and having a density of from 0.25 gram/cc. to 0.35 gram/cc. have been found to be most desirably because they most closely resemble roast and ground coffee.

In providing particles having surface curvatures it is important that the puffing procedure hereinbefore described yield a multidimensionally puffed sphere. If, for example, the particles to be granulated are one-dimensionally puffed particles a substantial decrease of particle surface curvature results which in turn results in a decrease in appearance similarity with respect to roast and ground coffee.

The following examples are offered to further illustrate but not limit the invention disclosed herein.

EXAMPLE I

With continuing reference to the drawing herein, 260 grams of dry powdered instant coffee 1 sold under the trade name of Folger was placed in a batch mixer 2. The original moisture content of the coffee was 3.5 percent. The moisture content was increased to 6.4 percent by adding water. Thereafter the water and coffee contained in the mixer 2 was heated to a temperature of 170° F. and mixed for 15 minutes until a flowable substantially uniform dough was obtained.

The dough was then spread upon two oven trays such that the dough thickness on each tray was one-eighth of an inch. The dough was allowed to cool for 15 minutes at which time it had reached ambient conditions (72° F.) and solidified to form a sheetlike slab of instant coffee one-eighth of an inch thick. Because the dough was cooled to ambient conditions only, a cooler 3 per se was not employed.

The highly frangible slabs were fractured into smaller more easily handleable portions and ground in a coffee grinder 4 to provide discrete particles of a particle size of through a 12-mesh U.S. Standard Sieve screen and on a 16-mesh U.S. Standard Sieve Screen.

The discrete particles of the above size were placed upon two oven trays and uniformly spread into layers of 0.250-inch thickness. The trays were placed in a vacuum oven 5 maintained at 186° F. and at a vacuum pressure of 29.90 inches. The moisture content of the discrete particles was rapidly driven off and puffing began almost immediately. After about two minutes puffing was completed.

The puffed instant coffee spheres 6 were examined and found to be multidimensionally puffed and had a crustlike surface and a highly porous center portion. The puffed instant coffee sphere particle size was through a 12-mesh U.S. Standard Screen and on a 16-mesh U.S. Standard Screen; the density was 0.32 gram/cc.

Thereafter a portion of the spheres 6 produced were dropped into hot water having a temperature of 180° F. and the spheres almost instantaneously collapsed and the instant coffee rapidly went into solution to provide a beverage of acceptable consumer quality.

When in example I the total coffee moisture content of step (a) is 12.0 percent, and when in the cooling of step (c), a cooler 3 is employed, and the cooling temperature is 32° F. for 2 hours, substantially similar results are obtained in that puffed instant coffee spheres as previously described are obtained.

EXAMPLE II

A 315-gram portion of the previously described dry powdered instant coffee 1 having a moisture content of 3.5 percent was placed in a hopper and gravity fed through a steaming zone 2a wherein steam was sprayed through a pressure nozzle onto the instant coffee. The steam temperature was 215° F. and the coffee was heated by the steam to a temperature of 190° F. Two passes through the steaming zone 2a provided a total moisture content of 8.6 percent and a coffee temperature of 190° F.

The moisture-laden instant coffee was then fed through a 4-inch Farrel two-roll mill 2b wherein mixing occurred and a flowable substantially uniform dough was formed and extruded into a sheetlike slab one-sixteenth of an inch thick. The slab was cut into about two equal portions and each portion was placed on an oven tray and allowed to cool for 20 minutes at ambient conditions, at which time the sheetlike slabs had solidified. Because only ambient cooling was employed, a cooler 3 was not employed.

The highly frangible slabs were fractured into smaller more easily handleable portions and ground in a coffee grinder 4 to provide discrete particles of a particle size of through a 12-mesh U.S. Standard Sieve and on a 16-mesh U.S. Standard Sieve screen.

The discrete particles were placed upon two oven trays and uniformly spread into layers of 1/10-inch thickness and the trays were placed in a vacuum oven 5 maintained at 191° F. and at a vacuum of 29.9 inches. The moisture content of the discrete particles was rapidly driven off and puffing occurred almost immediately. Both trays were removed and the multidimensionally puffed spheres 6 were examined. The spheres has a physical appearance substantially as hereinbefore described in example I, and a particle size of through a 10-mesh U.S. Standard Sieve screen and on a 14-mesh U.S. Standard Sieve screen; the density was 0.325 gram/cc. and the spheres were noted to exhibit fast-dissolving properties.

Thereafter a portion of the puffed instant coffee spheres 6 were shattered and granulated in a hammer mill granulator 7. The resulting particles substantially retained their particle surface curvature which gave the product the appearance of roast and ground coffee particles. The granulated instant coffee spheres 8 had a particle size of through 16-mesh and on 18-mesh and a density of 0.32 gram/cc.

What is claimed is:

1. A process for making multidimensionally puffed instant coffee particles having curved surfaces which impart the same distinctive appearance as the curved surfaces of coffee beans, said process comprising the steps of a. Adding moisture to dry instant coffee to increase the total moisture content of said coffee to within the range of from 6.0 percent to 15.0 percent to provide a moistened instant coffee; and
b. Heating said moistened instant coffee to a temperature within the range of from 150° to 210° F. and mixing said moistened instant coffee to provide a flowable substantially uniform dough; and thereafter,
c. Cooling said dough to provide sheetlike slabs of solidified instant coffee; and thereafter,
d. Grinding said slabs to provide discrete particles of soluble coffee of a particle size of between 6-mesh and 20-mesh U.S. Standard Screen sizes; and thereafter,
e. Heating said discrete particles to temperatures of from 100° to 210° F. at a vacuum pressure of from 20 to 30 inches of mercury whereby moisture contained in said particles is rapidly driven off and said particles multidimensionally puff to provide puffed instant coffee spheres; and thereafter,
f. Granulating said puffed instant coffee spheres.

2. The process of claim 1 wherein step (a) the total moisture content of said coffee is increased to within the range of from 7.0 to 10.0 percent.

3. The process of claim 1 wherein in step (b) said instant coffee is heated to a temperature within the range of from 160° to 180° F.

4. The process of claim 1 wherein in step (c) said slab of solidified instant coffee ranges in thickness from one thirty-second inch to one-quarter inch.

5. The process of claim 1 wherein in step (c) said slab of solidified instant coffee ranges in thickness from one-sixteenth inch to one-eighth inch.

6. The process of claim 1 wherein in step (c) said dough is cooled for from 1 hour to 4 hours at temperatures ranging from 20° to 80° F.

7. The process of claim 1 wherein in step (d) said discrete particles range in size between 12-mesh and 18-mesh U.S. Standard Screen size.

8. The process of claim 1 wherein in step (e) said discrete particles are heated to temperatures of from 180° to 205° F.

9. The process of claim 1 wherein in step (e) the vacuum pressure is from 25–30 inches of mercury.

10. The process of claim 1 wherein in step (e), prior to heating, said discrete particles are uniformly spread into a layer of from one-sixteenth inch to one-quarter inch thick.

11. The process of claim 1 wherein steps (a) and (b) are accomplished simultaneously by feeding the dry instant coffee particles of step (a) through a steaming zone.

12. The process of claim 11 wherein the instant coffee particles of claim 14 are mixed with moisture by passing said particles through a roll mill after said particles have passed through the steaming zone.

* * * * *

PO-1050
(5/69)

UNITED STATES PATENT OFFICE
CERTIFICATE OF CORRECTION

Patent No. 3,637,397            Dated January 25, 1972

Inventor(s) James H. Menzies and Joseph R. McSwiggin

It is certified that error appears in the above-identified patent and that said Letters Patent are hereby corrected as shown below:

Column 1, line 37    "or" should read -- and --.

Column 5, line 41,    "desirably" should read -- desirable --.

Column 8, line 24,    "14" should read -- 11 --.

Signed and sealed this 22nd day of August 1972.

(SEAL)
Attest:

EDWARD M. FLETCHER, JR.            ROBERT GOTTSCHALK
Attesting Officer                  Commissioner of Patents